May 6, 1941. H. C. BROCKMEIER 2,240,833
EGG TESTER
Filed Aug. 18, 1939
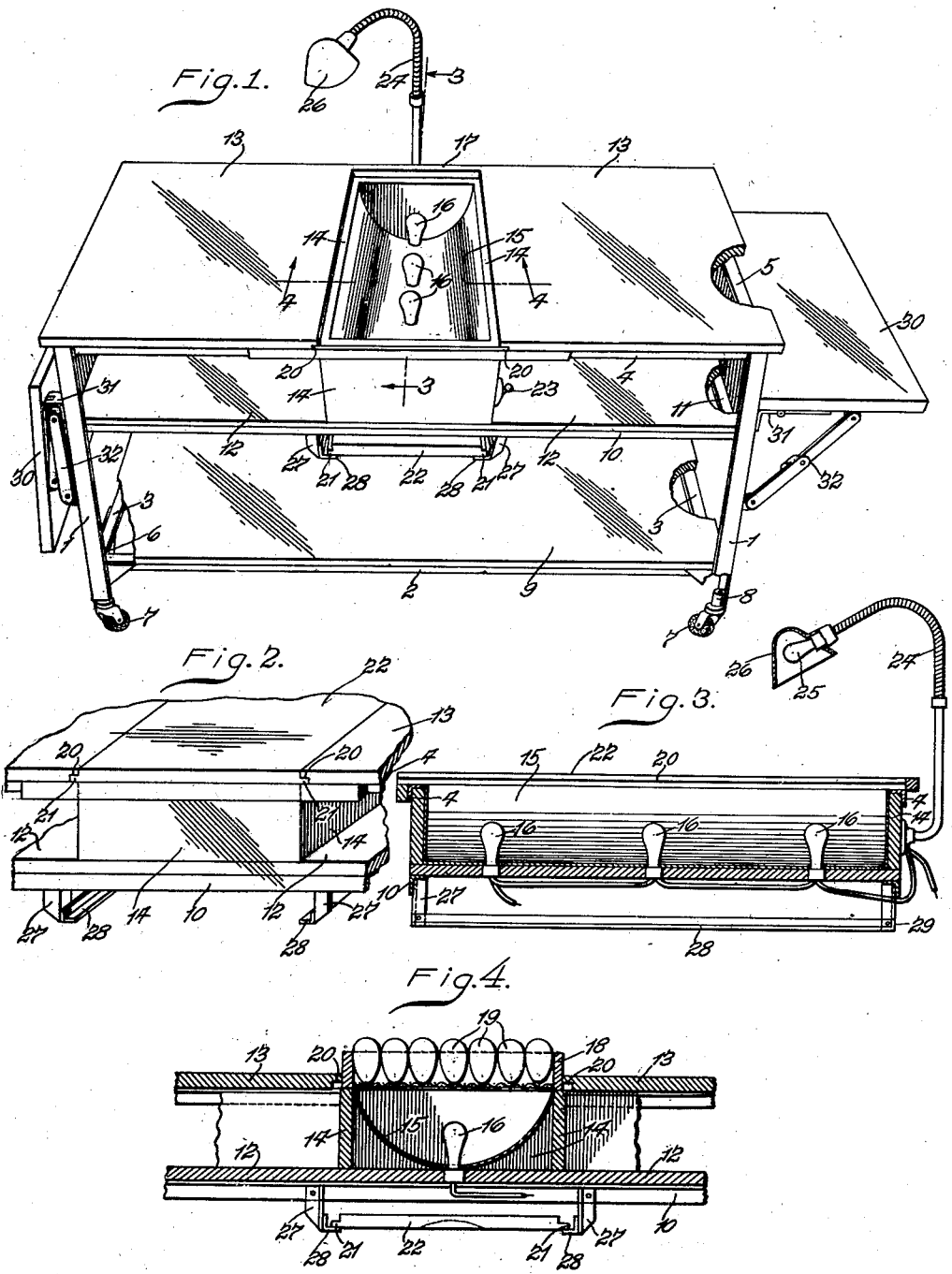
Inventor
Hilbert C. Brockmeier
by John D. Rippey
His Attorney Patented May 6, 1941

2,240,833

UNITED STATES PATENT OFFICE 2,240,833

EGG TESTER

Hilbert C. Brockmeier, Edwardsville, Ill.

Application August 18, 1939, Serial No. 290,754

5 Claims. (Cl. 88—14.1)

This invention relates to egg testers; and has special reference to egg testers for use in hatcheries to test the eggs during, and before the end of, the term of incubation, to facilitate the selection and separation of the eggs producing perfect chicks from the eggs that, for any reason, should not be further incubated.

An object of the invention is to provide a device which, for convenience, I have termed an "egg tester", but which is constructed and arranged so that it may be applied to different uses in hatcheries, such, for instance, as an egg tester to facilitate the selection and separation of good eggs from others during and before the end of the term of incubation, and also for use as a table for supporting crates for hatched chicks or for other uses.

Another object of the invention is to provide an improved egg tester comprising a frame provided intermediate of its ends with a reflector device containing lamps or the like, and supporting means at the top of the device for receiving and holding in proper position above the lamps and the reflector trays of eggs so that the user of the device may easily assort the eggs in the trays and remove such eggs as are imperfect.

Another object of the invention is to provide an improved egg tester comprising a table having end top portions separated by a transverse space, in combination with a reflector device supported below the top of the table and below said space and having lamps therein, and means for supporting trays of eggs above said reflector and lamps in proper position so that all of the eggs in the respective trays may be easily and conveniently inspected and assorted as to quality, the imperfect eggs being removed.

Another object of the invention is to provide an egg tester of the character mentioned having a removable top panel or slide adapted to close the space above the reflector, and means for supporting said panel or slide within the device and out of the way when it is desired to use the device as an egg tester.

Other objects and advantages of the invention should be readily apparent from the following description, reference being made to the annexed drawing, in which—

Fig. 1 is a perspective view of an egg tester constructed in accordance with the present invention and having the middle panel or top section removed.

Fig. 2 is a perspective view of a portion of the device showing the middle panel or top section in position to cooperate with the spaced end top sections to form a continuous top and to cover the reflector and lamps.

Fig. 3 is a vertical cross-sectional view on the line 3—3 of Fig. 1.

Fig. 4 is a sectional view on the line 4—4 of Fig. 1.

The device comprises a rigid metallic frame including four upright corner members 1 composed of angle bars, rigidly connected near their ends by longitudinal bars 2 and transverse bars 3 and, at their upper ends, by longitudinal bars 4 and transverse bars 5. The connections of the bars 2 and 3 with the upright corner members 1 may include triangular plates 6 attached to the uprights 1 and to the bars 2 and 3. Caster rollers 7 have their stems swiveled in sockets 8 at the lower ends of the uprights 1 and facilitate the movement of the device along the floor of the hatchery. A horizontal bottom wall or floor 9 is secured to the bars 2 and 3 and constitutes a shelf for supporting any articles such as chick crates (not shown), or the like.

Longitudinal angle bars 10 and transverse angle bars 11 are attached to the corner uprights 1 at a distance above the shelf or floor 9 and below the angle bars 4 and 5, and support a floor or wall member 12 constituting means for supporting chick crates or other articles.

A pair of relatively wide end top members 13 are attached to the upper sides of the bars 4 and 5 and are separated by a space below which an enclosure 14 is secured upon the shelf or floor 12 and to the inner edges of the top sections 13. A reflector 15 is located within the enclosure 14 and contains a number of removable and replaceable electric lamps 16 the upper ends of which are substantially below the upper sides of the frame members 4. The rear side edges of the top members 13 are connected by a relatively narrow abutment 17 having its upper surface in alinement with the upper surfaces of the top members 13. The side walls of the enclosure 14 are closer together than the space between the top members 13, so that the upper edges of said side walls constitute supports for removable and replaceable egg trays 18. The space between the top members 13 is approximately equal to the width of the standard egg trays 18, and the length of said space transversely of the device is approximately equal to the length of the standard egg trays. When a tray 18 is placed within this space, it seats upon the walls 14 and is supported thereby between the top members 13 and against the end abutment member 17. These parts cooperate to hold the tray stationary and to assist in placing the tray in proper position for inspecting or testing the eggs 19 contained in the tray.

The inner edges of the top members 13 are formed with rabbets 20 adapted to receive and retain flanges 21 extending along the sides of a removable and replaceable panel having a width approximately equal to the width of the space between the top members 13 and a length equal to the length of said space. Thus, when the panel 22 is slid into place, the flanges 21 engage in the rabbets 20 and the rear end of said panel engages against the abutment 17. The panel is thereby located and held in a position in which its upper surface is flush with the upper surface of the top members 13 and its forward end is even with the forward edges of said top members. This panel is easily insertable and withdrawable, so that the device may be transformed from a flat top table into an illuminated tester having a space in its top, or vice versa.

An electric switch 23 is mounted near the front of the enclosure 14 and is operative in a familiar way to control the lighting of the lamps 16. The rear end of the table may be equipped with a flexible standard 24 having on the end thereof a lamp 25, controlled by the switch 23, or otherwise as desired, and a shade 26. Since the shaft 24 is flexible, the lamp 25 may be moved to different adjusted positions above the table both laterally and vertically.

The space between the shelves 9 and 12 has a greater vertical height than the space between the shelf 12 and the top members 13. Downwardly extended arms 27 are rigidly attached to the bars 10, and parallel angle bars provided with inwardly extended flanges 28 are attached to said arms 27. The space between these angle bars is at least equal to the width of the panel 22, so that said panel may be easily slipped into position on the flanges 28 below the shelf 12. The rear ends of the angle bars 28 are formed with upturned abutments 29 to limit movement of the panel 22 rearwardly. Thus, when the device is to be used as an egg tester, the panel 22 is removed from the top and is placed upon the bars 28, leaving the space above the lamps 16 open to receive the trays 18. As a consequence, the device includes means whereby it may be readily transformed into a flat top table having its upper surface continuous from end to end and from front to rear; or the panel 22 may be removed to provide an open space in the top of the table having supporting means therein adapted to support the egg trays 18 while the top members 13 and the abutment 17 locate the trays in exact position and prevent displacement thereof during examination and inspection of the eggs 19.

Shelves 30 are connected to the upright corner members 1 by hinges 31, and may be supported in horizontal position by toggles 32 connecting said shelves with the uprights 1. The toggles 32 may be broken as shown at the left of Fig. 1 to permit the shelves to be turned or folded to extend downwardly instead of horizontally. These shelves 30 are below the top members 13 so that trays placed thereon will be held from displacement and guarded by the ends of the device.

This device is of rigid and durable construction and may be easily moved about the hatchery. No difficulty is encountered in transforming or changing the character of the device and its adaptability for use as an egg tester to a supporting table, or vice versa. Preferably, the switch 23 is of the familiar multiple type so that, when in one adjustment, all of the lamps 16 and 25 are out; when in another adjustment, the lamps 16 are lighted and the lamp 25 is out; when in a third adjustment, the lamp 25 is lighted and the lamps 16 are out; and, when in a fourth adjustment, all of the lamps 16 and 25 are lighted. These switches are of known commercial types, and the details thereof are not shown.

It should be apparent that this invention attains all of its intended aims and objectives very efficiently and satisfactorily. The device is available at comparatively low cost and is of durable construction. It may be varied in different particulars without departure from the nature and principle of the invention.

I claim:

1. A device of the character described comprising a frame, two horizontal table top members attached to the upper end of said frame and having their inner edges separated by a relatively wide space, a reflector attached to said frame below said space, a panel having about the same area as said space slidable into and from said space above said reflector, means for guiding said panel during its movement into said space and holding said panel in a position in said space in which its upper surface is even with the upper surfaces of said top members, lamps secured within said reflector and below said panel when said panel is in position in said space, and means for controlling the lighting of said lamps.

2. A device of the character described comprising a frame, two relatively wide horizontal top members attached to the upper end of said frame and having their inner edges separated by a relatively wide space, a panel slidable out of and into said space for opening and closing said space, supports below the inner edges of said top members adapted to support said panel in said space with its upper surface even with the upper surfaces of said top members and to support an egg crate located in said space between the inner edges of said top members when said panel is out of said space, and lamps supported below said space leaving said panel free for movement into and out of said space and leaving an egg crate free for movement to and from said supports.

3. A device of the character described comprising a frame, two relatively wide horizontal top members attached to the upper end of said frame and having their inner edges separated by a relatively wide space, a panel slidable out of and into said space for opening and closing said space, supports below the inner edges of said top members for supporting said panel in said space with its upper surface even with the upper surfaces of said top members and adapted to support an egg crate located in said space between the inner edges of said top members when said panel is out of said space, lamps supported below said space leaving said panel free for movement into and out of said space and leaving an egg crate free for movement to and from said supports, a reflector for said lamps below said space, walls forming an enclosure for said reflector, and means carried by said frame controlling the lighting of said lamps.

4. A device of the character described comprising a frame, two relatively wide horizontal top members attached to the upper end of said frame and having their inner edges separated by a relatively wide space which is open at one end, a panel slidable into said space with its upper surface in alinement with the upper surfaces of said top members and being withdrawable from said space, a flexible support attached to and extending above said frame and above said top members and being flexible to different adjusted positions above said top members and to a position above said space, a lamp carried by the upper end of said flexible support for illuminating the upper surface of said top members and said panel and articles thereon or within said space, and means in said space below the upper surfaces of said top members for supporting egg trays in position for illumination by said lamp.

5. A device of the character described comprising a frame, two relatively wide horizontal top members attached to the upper end of said frame and having their inner edges separated by a relatively wide space which is open at one end, a panel slidable into said space with its upper surface in alinement with the upper surfaces of said top members and being withdrawable from said space, a flexible support attached to and extending above said frame and above said top members and being flexible to different adjusted positions above said top members and to a position above said space, a lamp carried by the upper end of said flexible support for illuminating the upper surface of said top members and said panel and articles thereon or within said space below the upper surfaces of said top members, means in said space for supporting egg trays in position for illumination by said lamp, lamps supported below said space, and means for controlling the lighting of said first named lamp or said second named lamps as desired.

HILBERT C. BROCKMEIER.